US012770453B2

(12) United States Patent
Keylian et al.

(10) Patent No.: US 12,770,453 B2
(45) Date of Patent: Oct. 20, 2026

(54) METHOD AND APPARATUS FOR MODIFYING THE CONFIGURATION OF EXISTING GAMING MACHINES

(71) Applicant: Playrtech LLC, Las Vegas, NV (US)

(72) Inventors: Pierre Keylian, Henderson, NV (US); Ara Tcholakian, Las Vegas, NV (US)

(73) Assignee: PLAYRTECH LLC, Las Vegas, NV (US)

( * ) Notice: Subject to any disclaimer, the term of this patent is extended or adjusted under 35 U.S.C. 154(b) by 239 days.

(21) Appl. No.: 18/678,084

(22) Filed: May 30, 2024

(65) Prior Publication Data

US 2025/0371929 A1 Dec. 4, 2025

(51) Int. Cl.
*G07F 17/32* (2006.01)

(52) U.S. Cl.
CPC ...... *G07F 17/3211* (2013.01); *G07F 17/3216* (2013.01)

(58) Field of Classification Search
None
See application file for complete search history.

(56) References Cited

U.S. PATENT DOCUMENTS

| | | | | |
|---|---|---|---|---|
| 5,813,914 | A | 9/1998 | McKay et al. | |
| 7,862,436 | B2 | 1/2011 | Cole | |
| 8,118,663 | B2 | 2/2012 | Cole | |
| 8,672,766 | B1 | 3/2014 | Hancherick | |
| 9,652,929 | B2 | 5/2017 | Cornell | |
| 10,181,236 | B2 * | 1/2019 | Goldstein | G07F 17/3216 |
| 2005/0130746 | A1 | 6/2005 | Stephenson, III et al. | |
| 2007/0238531 | A1 * | 10/2007 | Taxon | G07F 17/3216 463/46 |
| 2008/0227554 | A1 | 9/2008 | Cole et al. | |
| 2018/0082523 | A1 * | 3/2018 | Palermo | G07F 17/3244 |

* cited by examiner

*Primary Examiner* — Ronald Laneau
(74) *Attorney, Agent, or Firm* — Snell & Wilmer LLP

(57) ABSTRACT

A method and apparatus facilitate the association of one or more new video displays with an existing gaming machine. The apparatus may comprise a modified door and door mounting elements, including a door mounting assembly, latching assembly and opening assembly, which facilitate mounting of the modified door to the housing of the existing gaming machine in replacement of an existing door thereof. One or more new video displays may then be associated with the existing gaming machine via the modified door.

15 Claims, 15 Drawing Sheets

METHOD AND APPARATUS FOR MODIFYING THE CONFIGURATION OF EXISTING GAMING MACHINES

FIELD OF THE INVENTION

The present invention relates to gaming machines, such as those which are utilized in casinos to present wagering games.

BACKGROUND OF THE INVENTION

Gaming machines of the type which are utilized in casinos are extremely expensive. In order to comply with regulations which are intended to ensure that these machines are reliable, tamper-proof and fault-tolerant, the machines are constructed to be extremely robust. For example, these machines have multiple layers of access-security, are designed to withstand electrical shock and surge, are configured with fault-tolerant memories which enable verification of game play events, and include robust cooling systems.

A casino may have thousands of such gaming machines on the casino floor. The problem that arises is that players constantly desire new and exciting game play experiences. To meet these demands, manufacturers are constantly both developing new games for presentation by the gaming machines, but also creating gaming machines which utilize new and more exciting technology.

Given the costs associated with these machines, however, casinos cannot simply replace their gaming machines each time a new game or new gaming machine design is introduced. In some cases, server-based gaming has allowed casinos a simpler way to update game content on their gaming machines. However, this still leaves gaming machines with older physical designs on the casino floor, where those machines are still generally less attractive to players.

As one example, FIG. 1 illustrates a Bally Gaming (now Light & Wonder) AP1 V22 model gaming machine. This gaming machine has a housing H. At the front of the housing H is a forwardly extending console C (such as which may support player input buttons) and frame elements F1 and F2 at opposing sides. Between the frame elements F1 and F2 are two 22 inch (diagonal) LCD displays (D1 and D2) arranged in landscape orientation and a speaker bar S. The displays D1 and D2 are associated with a door which can be opened and closed, thus permitting them to be moved to a position in which the rear of the displays is accessible, along with an interior of the housing H there behind.

Newer gaming machines commonly utilize single large displays, such as 34 inch or larger displays, often arranged in a portrait orientation. The displays of these machines permit more information to be displayed and in a configuration where the information is presented seamlessly (and is not broken, such as at the frames of two adjacent displays).

A solution to these and other problems associated with existing gaming machines is desired.

SUMMARY OF THE INVENTION

Aspects of the invention comprise methods of modifying a gaming machine and apparatus for modifying a gaming machine, such as a retrofit kit. In one embodiment, the method and apparatus facilitate the association of one or more new video displays with an existing gaming machine, such as via a modified door which is associated with a housing of an existing gaming machine in replacement of the existing door thereof. Additional aspects of the invention comprise a modified gaming machine, such as comprising a housing of an existing gaming machine fitted with a new door and one or more new video displays.

One embodiment of a method of modifying an existing gaming machine comprises the steps of: removing an existing door and an associated existing video display from a housing of the existing gaming machine; providing a modified door assembly comprising a modified door, a door mounting assembly, a door opening assembly and a door latching assembly; connecting the modified door to the housing utilizing the door mounting assembly; connecting the door opening assembly to the modified door and the housing, whereby the door opening assembly facilitates movement of the modified door between a first, open position relative to the housing of the housing and a second closed position; associating the door latching assembly with the modified door in relation to a latching mechanism which is mounted to the housing; and connecting at least one new video display to the modified door, the at least one new video display differing in at least one of size and shape from the existing video display.

In one embodiment, the apparatus may comprise a retrofit kit, such as which includes the modified door and one or more of the door mounting assembly, the door opening assembly and the door latching assembly.

Further objects, features, and advantages of the present invention over the prior art will become apparent from the detailed description of the drawings which follows. when considered with the attached figures.

DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Aspects of the invention comprise methods of modifying a gaming machine and apparatus for modifying a gaming machine. In one embodiment, the method and apparatus facilitate the association of one or more new video displays with an existing gaming machine, such as via a modified door which is associated with a housing of an existing gaming machine in replacement of the existing door thereof. Additional aspects of the invention comprise a modified gaming machine, such as comprising a housing of an existing gaming machine fitted with a new door and one or more new video displays.

Figure 1:
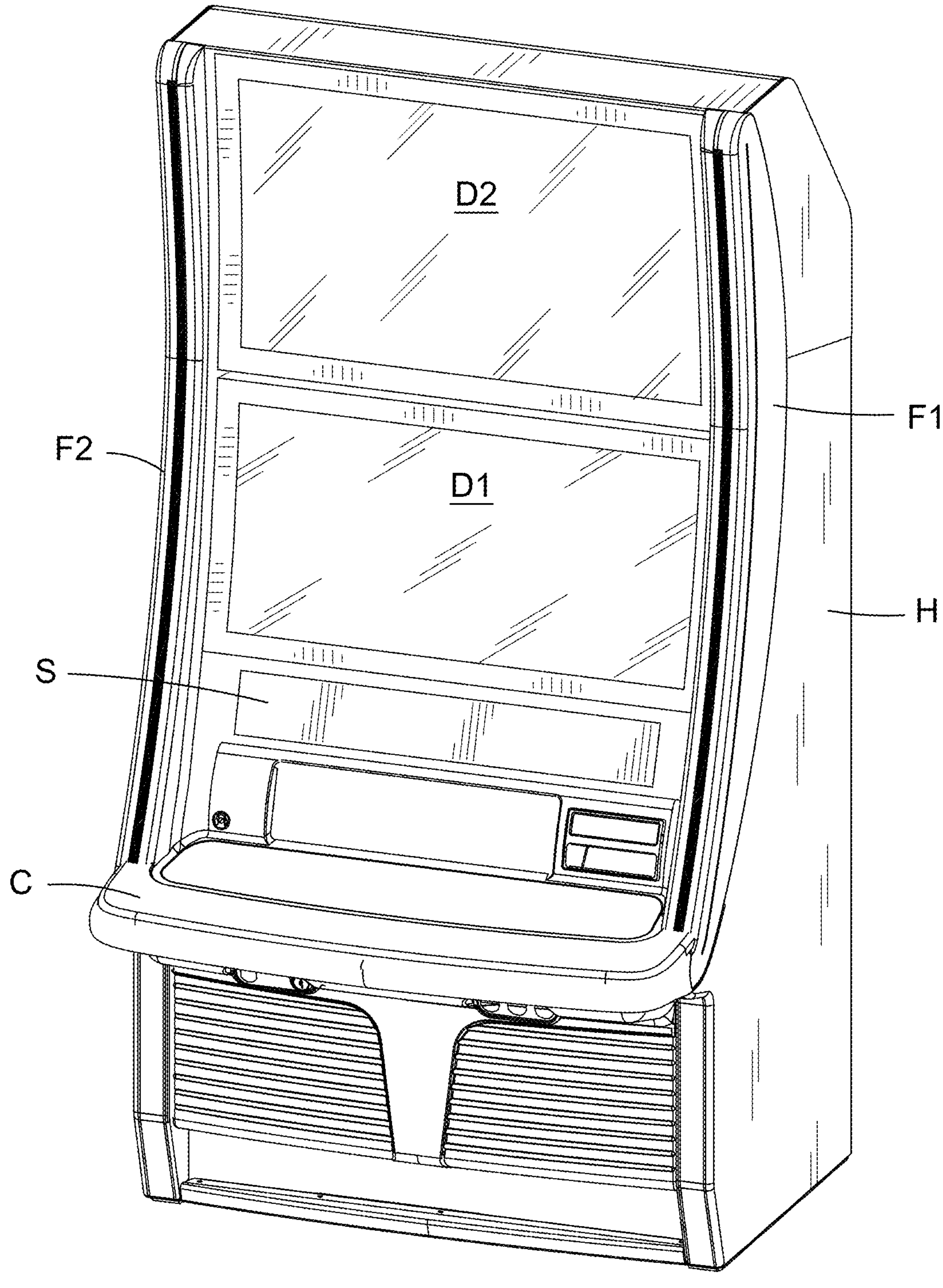
FIG. 1 (Prior Art)
FIG. 1 illustrates a configuration of a gaming machine in accordance with the prior art.
Figure 2:
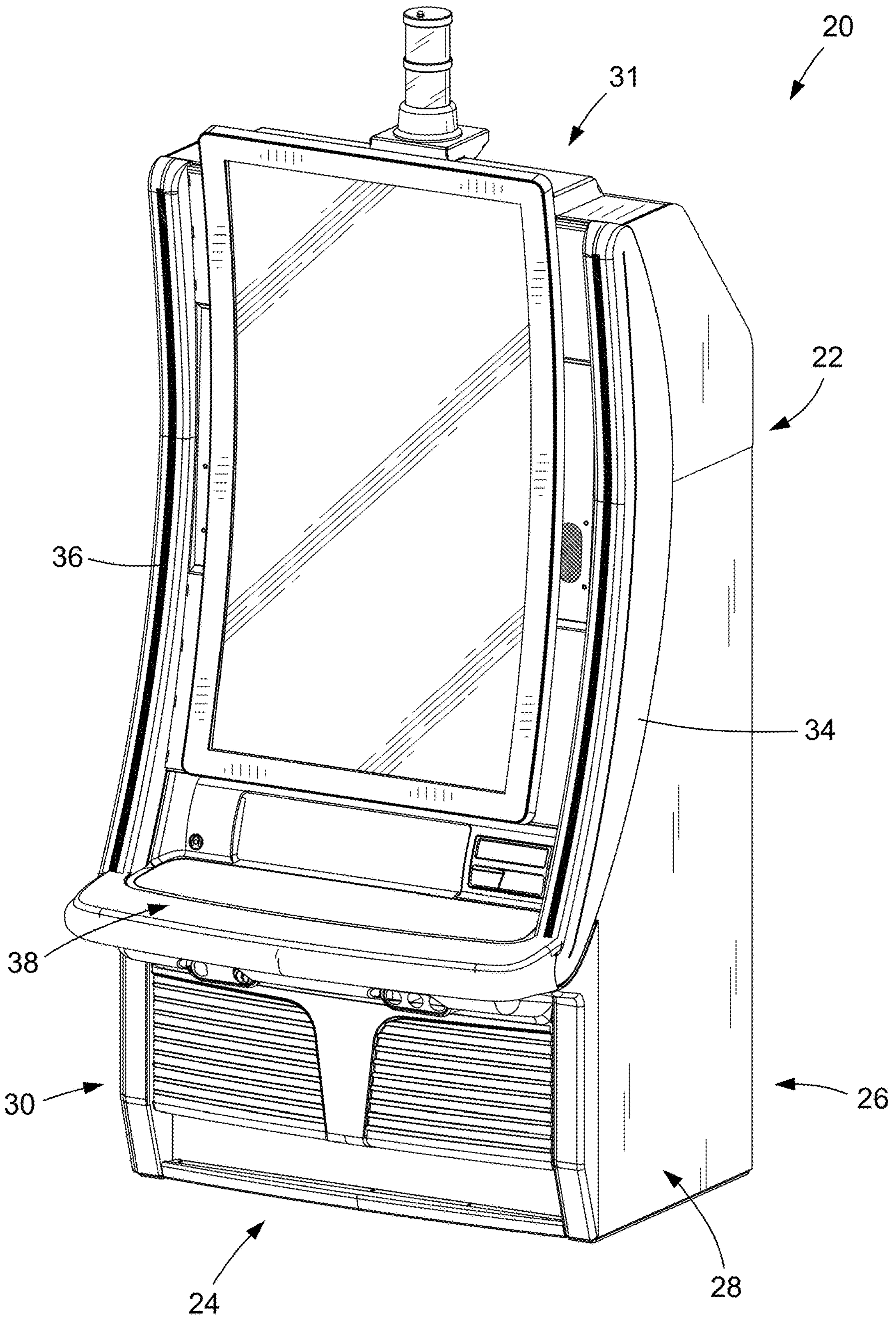
FIG. 2 is perspective front view of a modified gaming machine in accordance with an embodiment of the invention.
Figure 3:
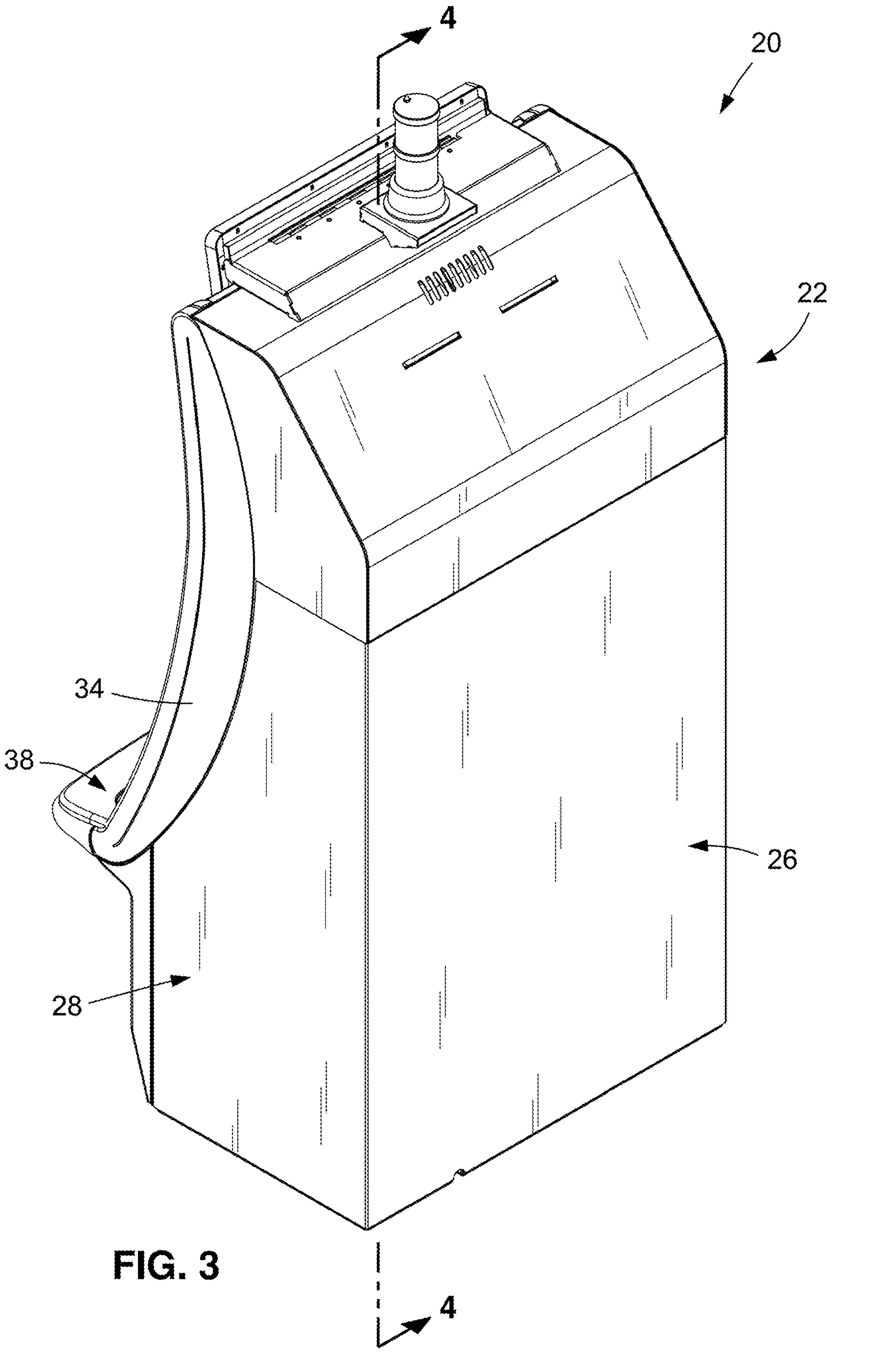
FIG. 3 is a perspective rear view of the modified gaming machine illustrated in FIG. 2.

FIGS. 2 and 3 illustrate a modified gaming machine 20 in accordance with an embodiment of the invention. As illustrated, the modified gaming machine 20 preferably comprises a housing 22 of an existing gaming machine. The existing gaming machine housing 22 (and thus the housing of the modified gaming machine 20) may have various shapes and sizes, such as depending upon the configuration of the existing gaming machine. In one configuration, the existing gaming machine housing 22 has a front 24, a rear 26, first and second opposing sides 28, 30, and a top 31. In the case of the Bally AP1 V22 gaming machine illustrated in FIG. 1, a first frame element 34 and a second frame element 36 may be located at the front of the housing 22 at opposing sides thereof. Further, a console 38 may extend outwardly from the front 24 of the housing 22.

As one aspect of modifying an existing game machine, one or more features or elements of the existing gaming machine are removed. For example, relative to the Bally AP1 V22 gaming machine, the two displays D1 and D2 and the speaker bar B and their associated mounting structure, are preferably removed. As described in more detail below, a door 40 is associated with the housing 22 and at least one new video display 58 is associated with the door 40, and thus the housing 22 (because the door 40 is in replacement of the existing door of the existing gaming machine, it may be referred to as a new or modified door, to contrast it with the existing door). As detailed below, other components of the existing gaming machine may be removed and/or moved as part of creating the modified gaming machine 20.

Figure 4:
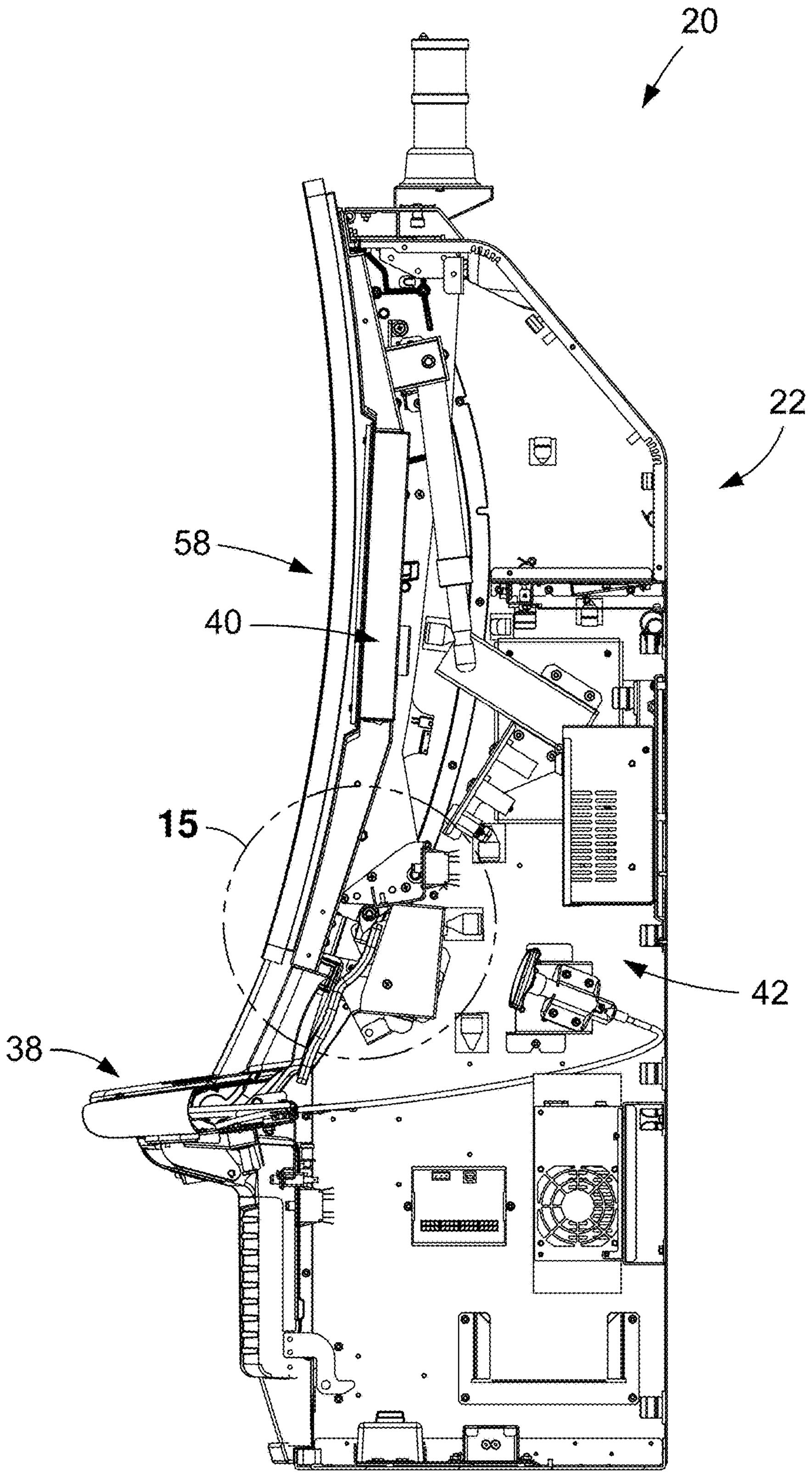
FIG. 4 is a cross-sectional view of the modified gaming machine illustrated in FIG. 3 taken in the direction of line 4-4 therein.
Figure 5:
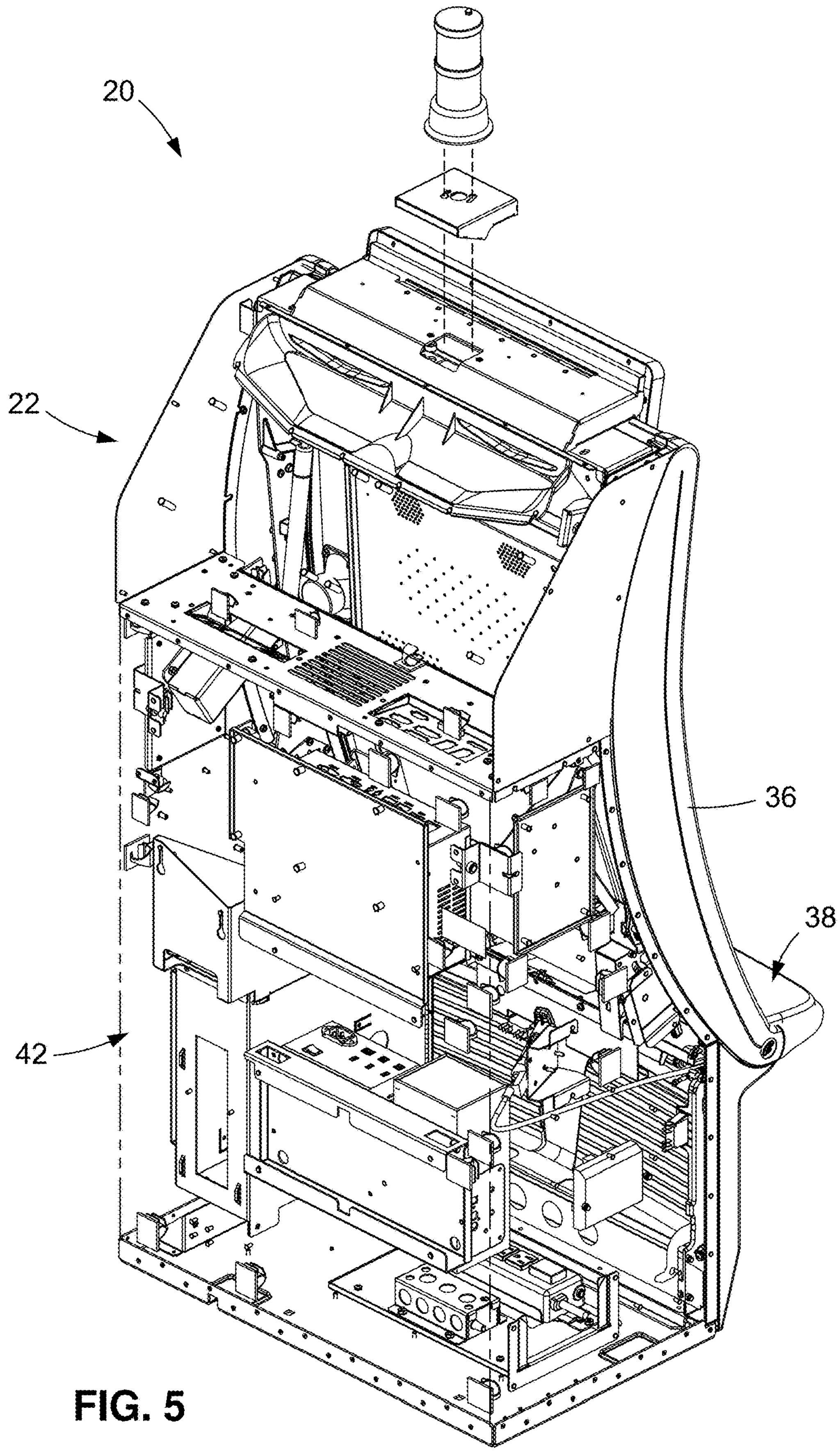
FIG. 5 is a partial cut-away and partially exploded perspective rear view of the modified gaming machine illustrated in FIG. 1.

As illustrated in FIGS. 4 and 5, the housing 22 of the modified gaming machine 20 preferably defines, in cooperation with the door 40, a gaming machine interior 42. The gaming machine interior 42 may house a number of gaming machine components, such as a gaming machine controller (including a processor and a memory), a communication interface, a power supply, a fan, various peripheral devices and the like, which are utilized to present one or more games. In one embodiment, as described below, the modified gaming machine 20 is preferably constructed using the majority of the existing gaming machine's components, thus minimizing the amount of modification to the existing gaming machine which is necessary to create the modified gaming machine.

Figure 6:
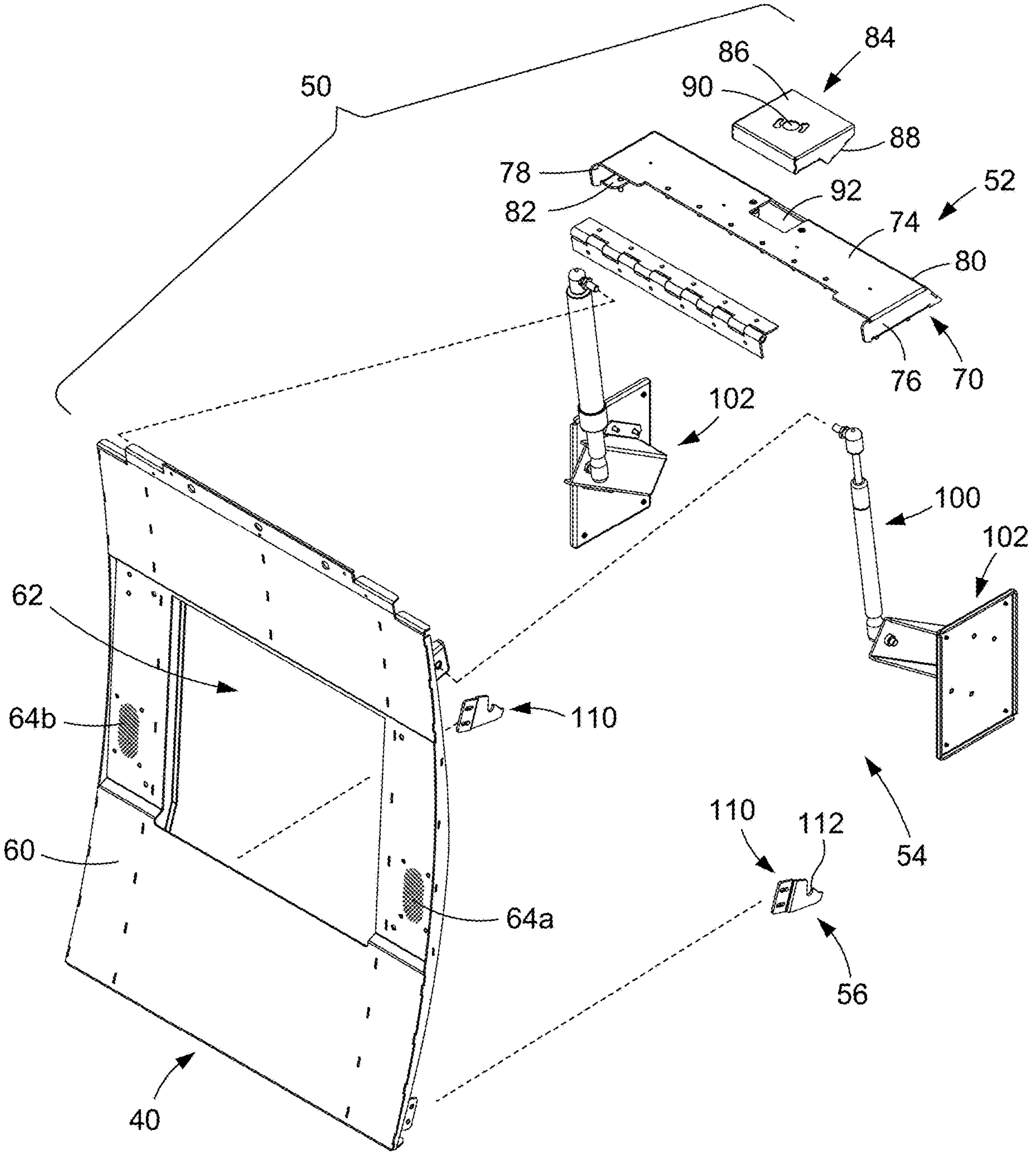
FIG. 6 is an exploded view of elements of a modified door assembly in accordance with an embodiment of the invention.
Figure 7:
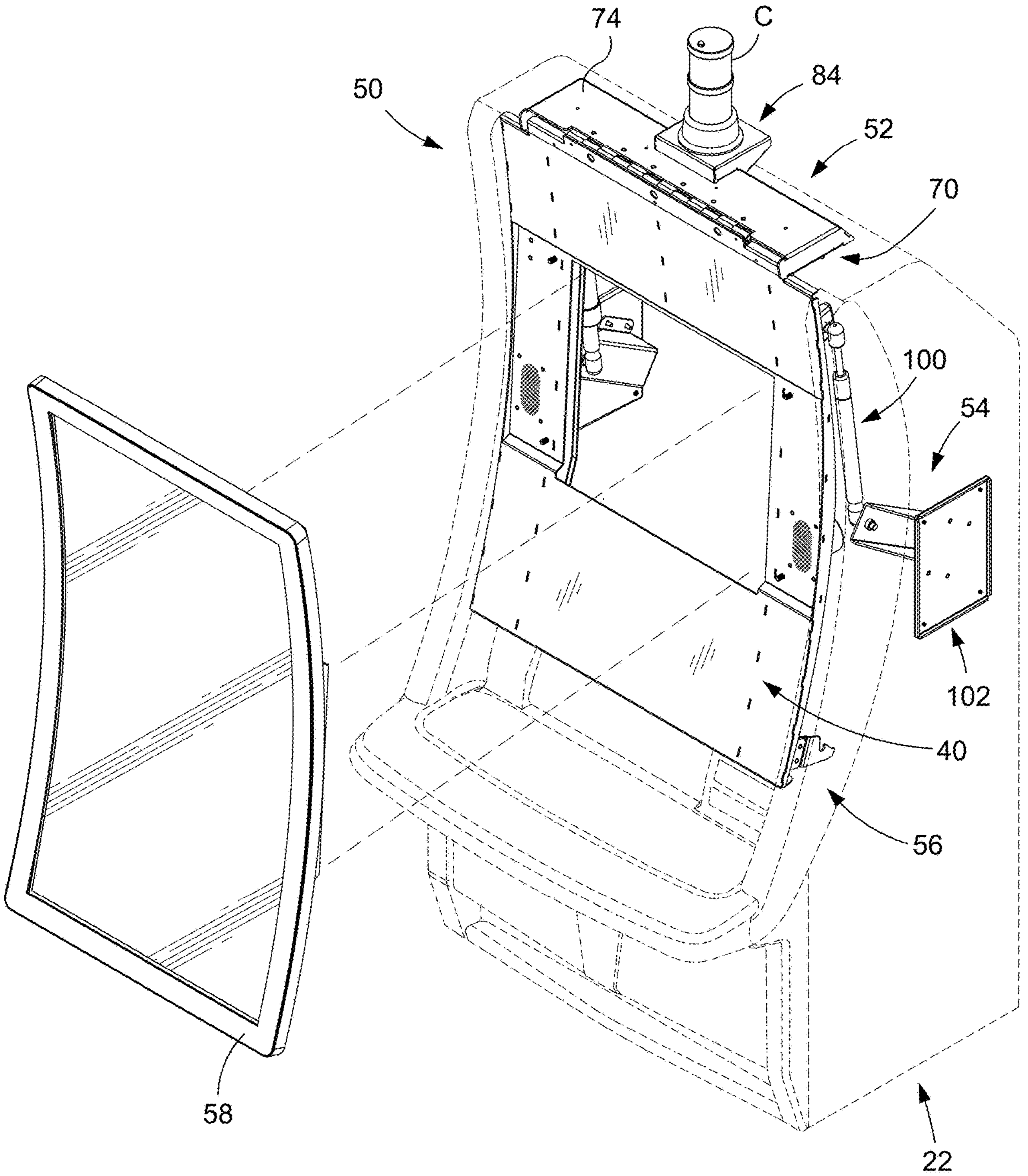
FIG. 7 illustrates the modified door assembly in an assembled configuration for mounting of a video display thereto, in relation to a housing of the modified gaming machine illustrated in FIG. 1.

One embodiment of the invention comprises an apparatus (such as which may be provided in the form of one or more retrofit kits) for modifying an existing gaming machine. Referring to FIGS. 6 and 7, in one embodiment, the apparatus comprises a modified door assembly 50. In one configuration, the modified door assembly 50 comprises the door 40, a door mounting assembly 52, a door opening assembly 54, and a door latching assembly 56. The modified door assembly 50, and particularly the door 40, is preferably configured to support one or more new video displays 58. Additional features of the modified door assembly 50 and the use thereof, will now be described.

Referring to FIGS. 6 and 7, the door 40 comprises a support for one or more elements of the gaming machine 20, such as the new video display 58. The door 40 may comprise a frame 60 having a front and a rear. The frame 60 is preferably configured to mount to the housing 22 and be located at the front 24 of the gaming machine 20. In the case of the Bally AP1 V22 gaming machine, the frame 60 may be generally rectangular in shape, having a width dimension (between first and second sides of the door frame 60) which is less than the distance between the two frame elements 32,34 and a height dimension (between a top and a bottom of the door frame 60) which is less than a distance between a top of the gaming machine housing 22 and the console 38 (although the dimensions of the one or more new video displays 58 may be larger, such as where the one or more new video displays 58 have a width which exceeds the distance between the two frame elements 32, 34, or a height which is greater than the distance between the top of the gaming machine housing and the console—such as where the new video display extends above the top of the gaming machine housing). For example referring to FIG. 1, in a configuration in which the displays D1 and D2 and the speaker bar S are removed from such an existing gaming machine, the door frame 60 preferably has a dimension which allows it to fit into the space previously occupied by those components.

Figure 11:
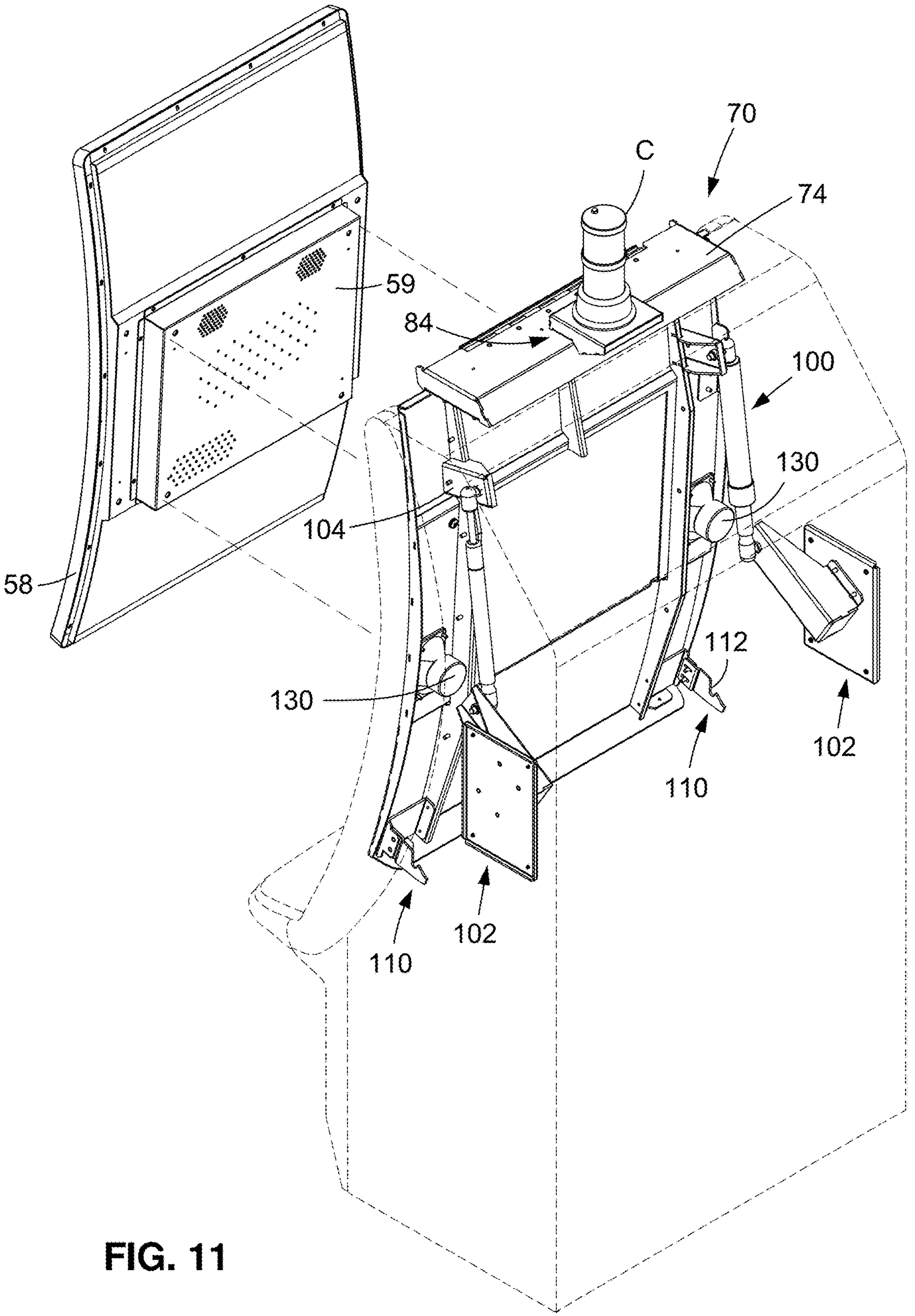
FIG. 11 is a rear perspective view of the modified door assembly illustrated in FIG. 7.
Figure 12:
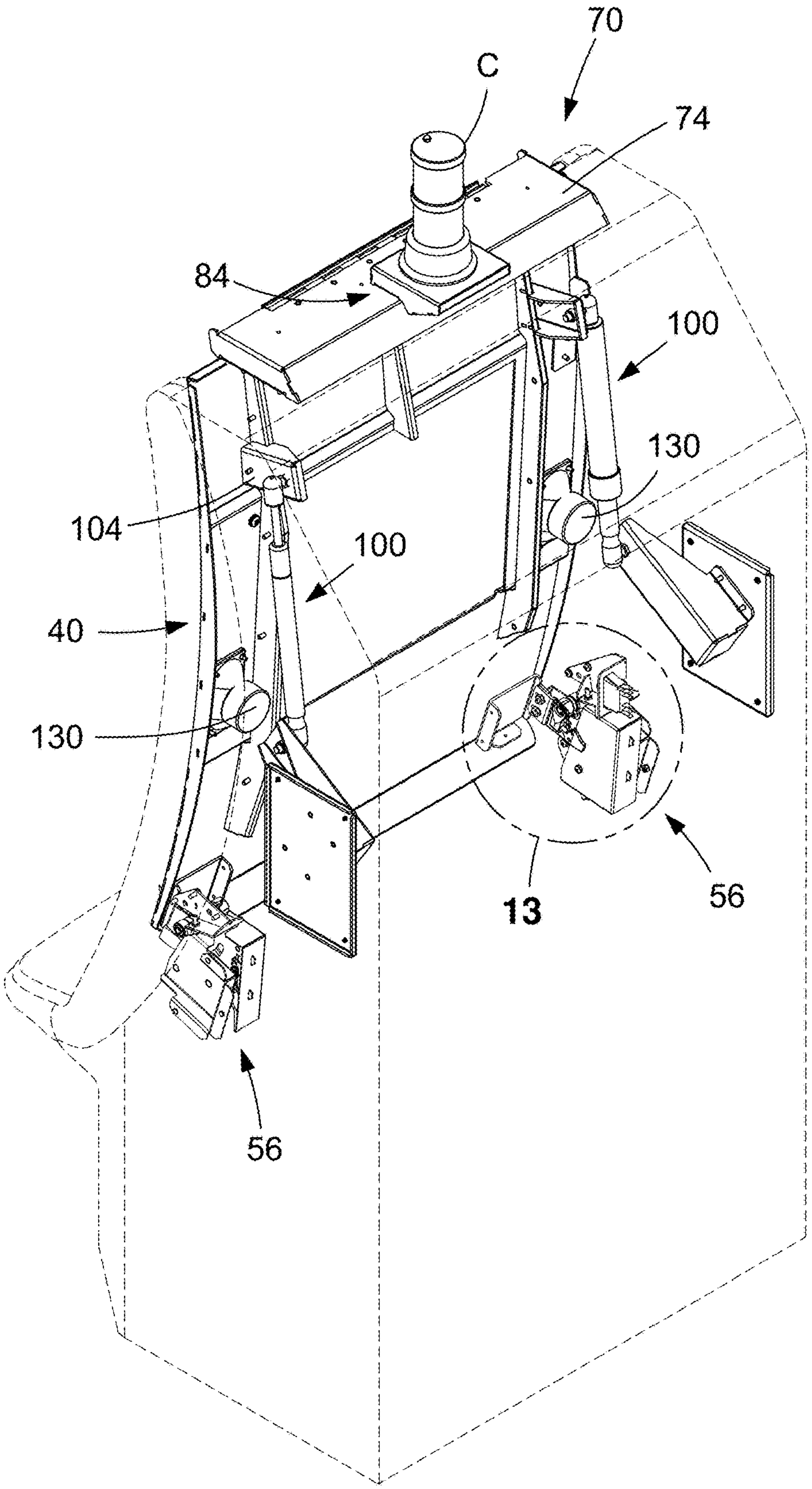
FIG. 12 illustrates the modified door assembly illustrated in FIG. 11, as further including a door latching assembly.

In one embodiment, the door frame 60 may define one or more openings, such as a main opening 62 and one or more speaker openings 64*a,b*. The main opening 62 may have different shapes and dimensions, but may be generally centrally located, such as to allow a controller portion 59 of the display 58 (see FIG. 11) to extend therethrough (and to keep the remainder of the back of the new video display 58 flush against the front of the door frame 60), and for providing access to that controller portion 59 of the new video display 58. The speaker openings 64*a,b* may also have different sizes and shapes. In one embodiment, the two speaker openings 64*a,b* are located near the opposing first and second sides of the door frame 60.

The door frame 60 may be constructed from metal, such as bent sheet metal or other components. In other configurations, the door frame 60 may be constructed of a plurality of individual elements which are connected to one another.

As illustrated in FIG. 6, the door mounting assembly 52 may include a door mount 70 and means for connecting the door 50 to the door mount 70, preferably in a moving manner. The door mount 70 may comprise an elongated support which is configured to be attached to the housing 22, such as at the top 31 thereof.

Figure 10:
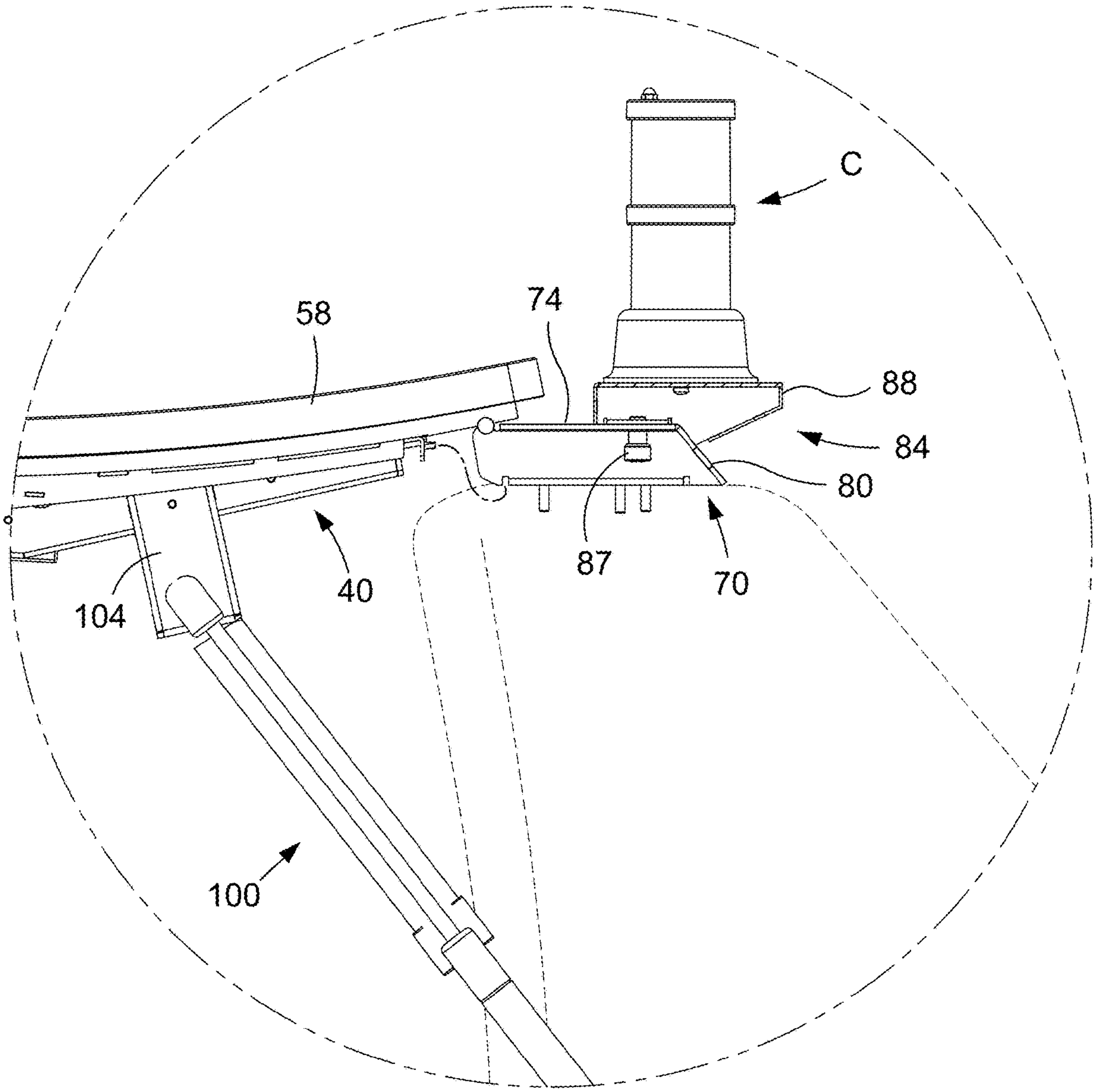
FIG. 10 is an enlarged view of the portion of the modified door assembly identified by line 10 in FIG. 9.

In one embodiment, the door mount 70 comprises a raised top plate 74 having a front, a rear and a pair of opposing ends. First and second flanges 76, 78 may extend downwardly from the top plate 74 at the ends, as may a wall or flange 80 at the rear thereof. The first and second flanges 76, 78 may each include an inwardly extending foot 82. When the door mount 70 is mounted to the housing 22, the foot 82 portion of each flange 76, 78 may be placed onto the housing 22. One or more fasteners (such as rivets, pins, nuts and bolts, screws, etc.) may then be used to connect each foot 82 to the housing 22. In this configuration, as best illustrated in FIG. 10, the top plate 74 is positioned vertically above the housing 22, thus creating a generally enclosed interior space between the door mount 70 and the top 31 of the housing 22.

Figure 8:
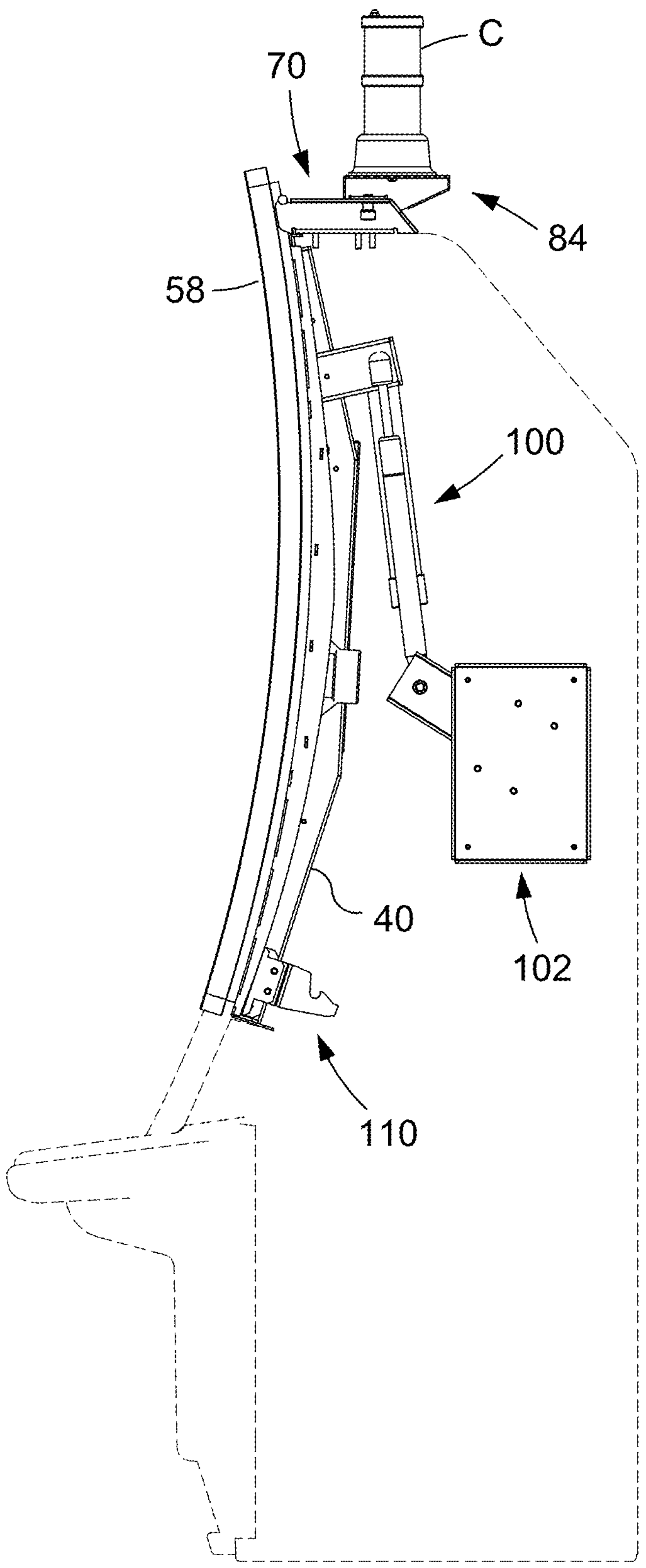
FIG. 8 is a side view of the assembled modified door assembly illustrated in FIG. 7, with a door thereof in a closed position, with portions thereof shown in cross-section.
Figure 9:
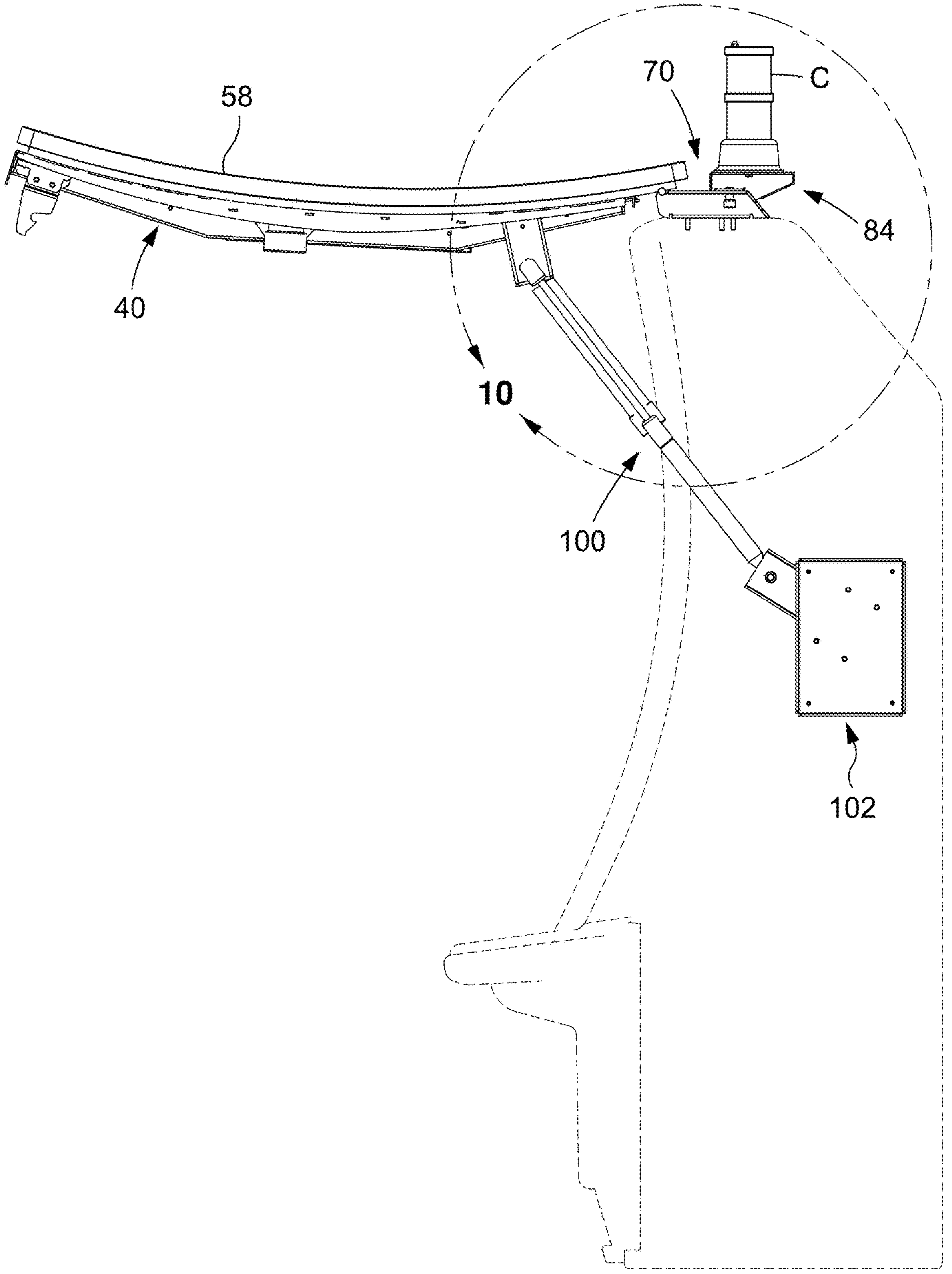
FIG. 9 illustrates the assembled modified door assembly of FIG. 8, with the door in an open position.

Preferably, the door 40 is movably mounted to the door mount 70, and most preferably, rotatably mounted relative to a top of the door 40. For example, in one configuration, a hinge 72 is connected to the door mount 70 and the top of the door frame 60 of the door 40. The hinge 72 might comprise a first portion which is mounted to the door mount 70 and a second portion which is mounted to the door frame 60, where the first and second portions are rotatably mounted to one another. As described in more detail below, this mounting preferably allows the door 40 to be moved between a closed position (as illustrated in FIG. 8) and an open (and in this case, raised) position (as illustrated in FIG. 9). In one embodiment, the hinge 72 is an elongated hinge which extends along the front of the door mount 70 and the top of the door 40, but in other embodiments, two or more hinge members, such as spaced from one another, might be utilized. In yet other embodiments, the hinge might be integrated into the door mount 70 and/or door frame 60, such as by those portions defining alternating passage sections for accepting a common hinge pin therethrough.

In some situations, a candle C may be associated with the top of an existing gaming machine which is being modified. In one embodiment, the candle C may be re-mounted to the housing 22, or might be mounted directly to the door mount 70. In a preferred embodiment, however, the candle C is mounted to the door mount 70 via a candle support 84, as illustrated in FIGS. 6-10. The candle support 84 may comprise a body which defines a top 86 onto which the candle C may be positioned and connected, such as via one or more spring-loaded captive screws 87 (see FIG. 10) which include a head portion (such as engaging a portion of the candle support 84) and a shoulder retainer (such as located in the interior space below the top plate 74 of the door mount 70). The candle support 84 may also include one or more downwardly extending walls or flanges 88, such as for connection to the top plate 74 of the door mount 70.

In one embodiment, one or more passages 90 may be provided through the top 86 of the candle support 84, such as to allow wiring and the like to pass there through from the interior of the housing 22. Such wiring may also be guided through an opening 92 in the top plate 74 (such as which is positioned under the candle support 84 when connected thereto). The shape and size of the candle support 84 may vary. As illustrated, the candle support 84 may be configured to extend rearwardly from the rear of the top plate 74 so that the candle C is generally centered at the top of the housing 22.

As indicated above, the door 40 is preferably movable between a closed and an open position. In one embodiment, the door opening assembly 54 is configured to aid in movement and/or positioning of the door.

In one embodiment, referring to FIGS. 6-9, the door opening assembly 54 comprises at least one means for biasing the door 40 towards its open (in this case, raised) position. In one embodiment, the means for biasing comprises at least one, and preferably two, pneumatic shocks or struts 100. In a preferred embodiment, a pneumatic shock 100 is provided corresponding to each side of the door 40.

Each shock 100 preferably has a first end connected to a cabinet mount 102. The cabinet mount 102 may comprise, for example, a plate or other member which is designed to connect (such with a planar face thereof) to one of the sides 28, 30 of the housing 22, at the interior 42 thereof. An opposing, second end of each shock 100 may be configured to mount or connect to a flange 104 which extends outwardly from the rear of the door frame 60. In one embodiment, fasteners used to connect the cabinet mount 102 are designed to align (such as by passing through passages in the cabinet mount 102) with existing mounting holes in the housing 22. Preferably, each cabinet mount 102 causes the first end of each shock to be positioned rearwardly of, and below, the second end of the shock. In this configuration, the second end of each shock 100 is connected to the door 40 near the top thereof, and adjacent one of the sides.

Referring to FIGS. 6 and 12-16, the door latching assembly 56 comprises one or more catches 110. As illustrated, the catches 110 may have a first end which is mounted to the door frame 60 and extends outwardly from a rear thereof towards the interior 42 of the housing 22. The second or distal end of the catch 110 may define a slot 112 for removably accepting a locking pin 122 (see FIG. 16).

Figure 14:
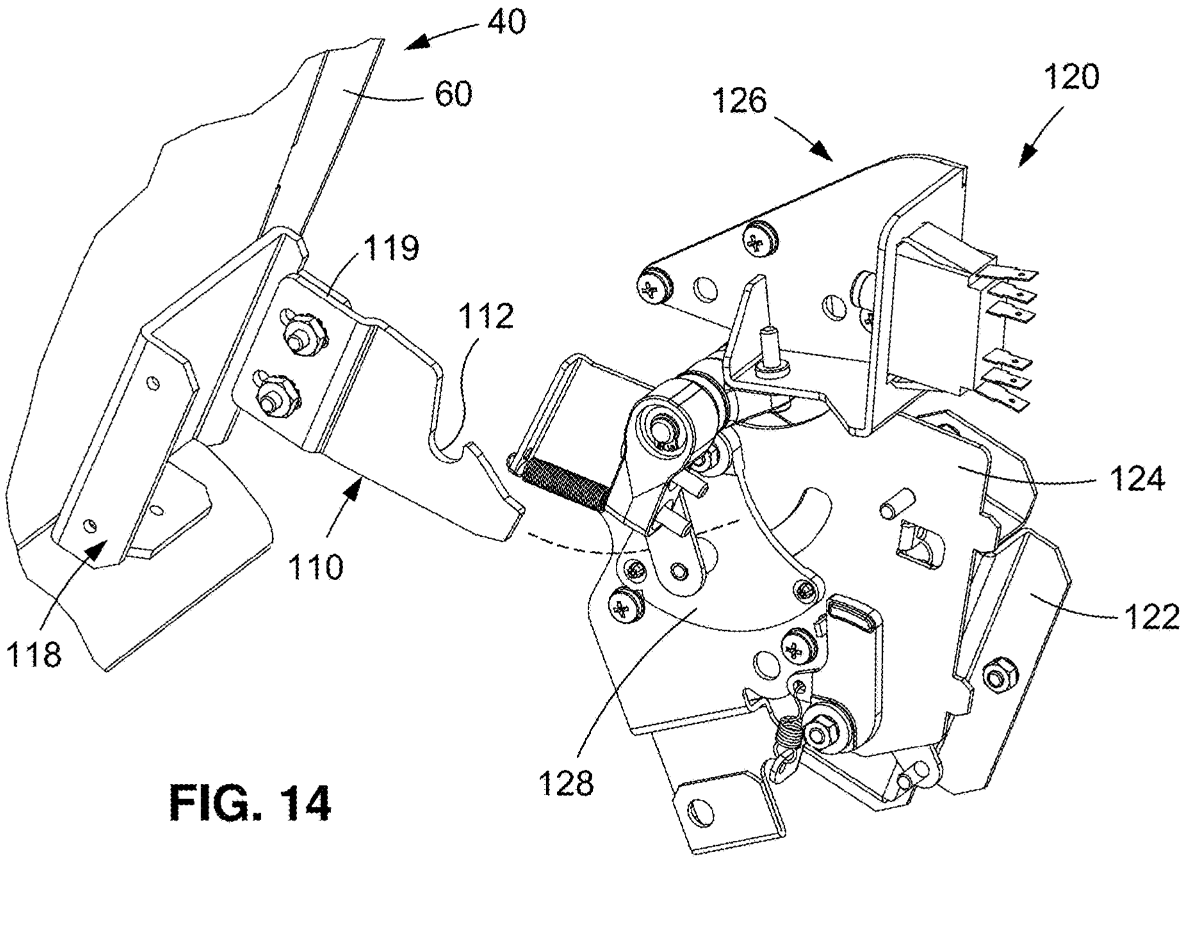
FIG. 14 is an exploded view of the door latching assembly illustrated in FIG. 13.
Figure 16:
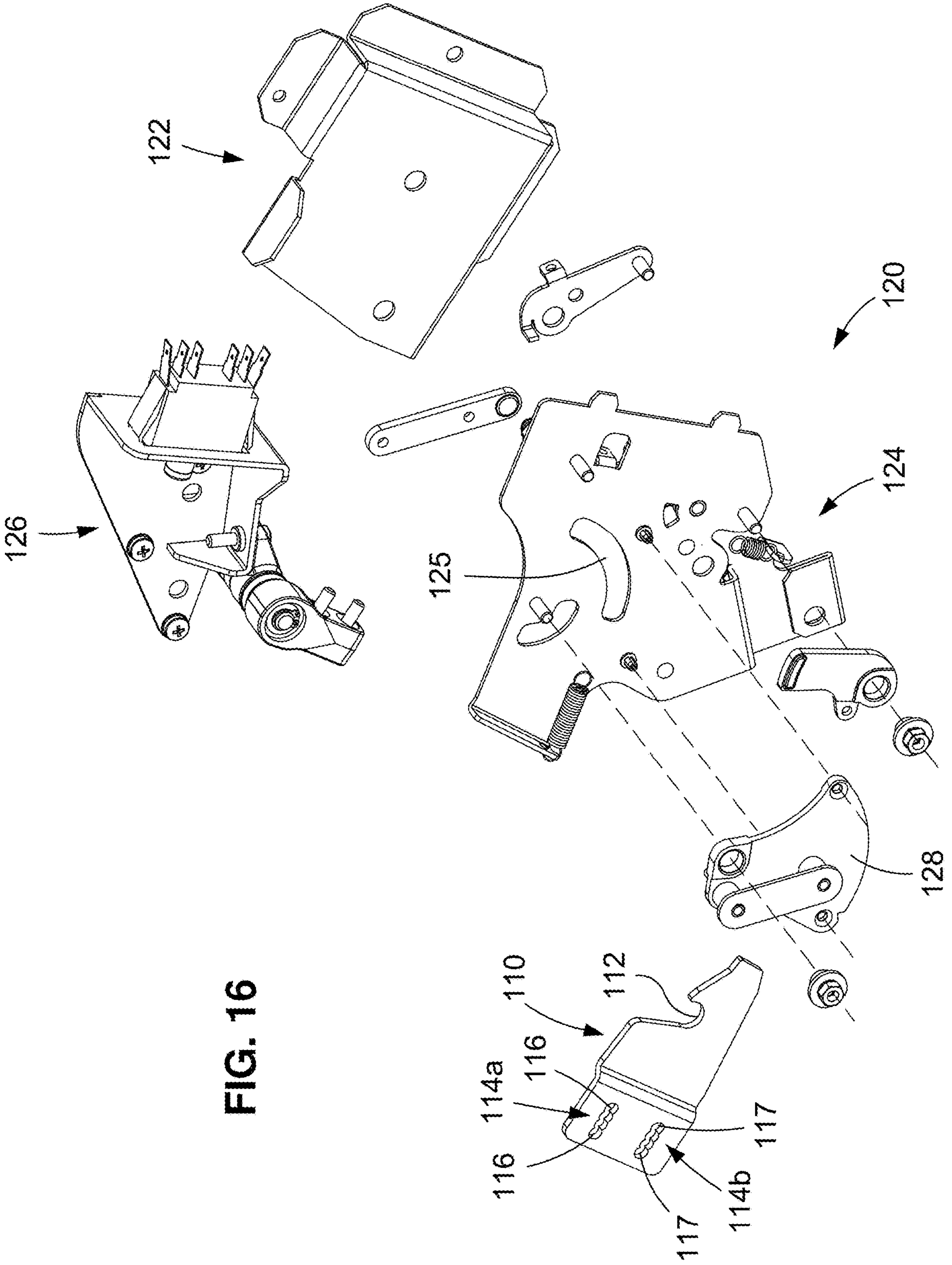
FIG. 16 is an exploded view of the portion of the door latching assembly illustrated in FIG. 13.

In one embodiment, as illustrated in FIGS. 14 and 16, the catches 110 are preferably adjustably mounted, preferably relative to the housing 22 (and thus, as described below, a mating locking mechanism associated with the housing 22). In one embodiment, each catch defines one or more mounts, such as a fastener accepting aperture. In a preferred configuration, the catches 110 include a first aperture **114*a* and a second aperture 114*b* therethrough (from one side to another), such as where the first and second apertures 114*a,b* are in different vertical positions relative to the slot 112. In one embodiment, the first aperture 114*a* may define a plurality of first fastener positions 116 and the second aperture 114*b* may define a plurality of second fastener positions 117. While in one embodiment the fastener positions 116, 117 may comprise portions of the same aperture (including where portions of the aperture have different sizes or dimensions, such as which accept a fastener therethrough or prevent movement of the catch 110** relative to the fastener), in others, they might be defined by different apertures.

As illustrated in FIG. 14, the catch 110 may be mounted to the door 40, such as via a bracket 118 or other mount, such as which may include an outwardly extending flange 119. The bracket 118 and/or catch 110 may be mounted to the rear of the door 40 or to a side or other portion (such as other portions of the frame 60), preferably so that at least a portion of the catch 110 extends away from the door 40 and, when the door is closed, extends into the housing 22. A first fastener may be passed through the first aperture **114*a* in the catch 110 and a mating aperture in the flange 119, and a second fastener may be passed through the second aperture 114***b* in the catch 110 and another mating aperture in the flange 119. The position of the catch 120 relative to the housing 22 (and thus, as detailed below, a locking mechanism) may be adjusted by changing the position that each of the fasteners engages the respective first and second apertures 114*a,b,* such as the first and second fastener positions 116, 117. By changing the positions of the fasteners relative to the first and second apertures 114*a,b* forward and rearwardly, the distance that the catch 110 extends into the housing 20 may be adjusted. Further, when the fasteners are engaged with the first and second apertures 114*a,b* in different fastener positions, the angle of the catch 120 may be adjusted relative to the housing. In one embodiment, the fasteners may comprise nuts and bolts. In others, studs may extend from the bracket 118 and the catch 110 may be slipped over the studs and tightened into place, such as with nuts.

Referring to FIG. 16, the door latching assembly 56 may comprise a locking mechanism 120. The locking mechanism 120 may comprise a mounting bracket 122, such as which is configured to mount to the housing 22 of the modified gaming machine 20. In one embodiment, the mounting bracket 112 is configured to mount to an inside of one of the sides of the housing 22, such as with one or more fasteners.

In one embodiment, the locking mechanism 120 further comprises a control body 124, a latch release mechanism, such as in the form of an actuator 126, and a movable locking pin 128. As illustrated, the control body 124 may comprise a plate which is mounted to a face of the mounting bracket 122. The movable locking pin 128 may be movably mounted relative to the control body 124, such relative to a slot 125 formed therein. The actuator 126 is preferably configured to effect movement of the movable locking pin 128. The actuator 126 may comprise, for example, a motor which rotates a drive member 132 which drives the movable locking pin 128. The actuator 126 may be mounted to the mounting bracket 122, or directly to the housing 22 of the modified gaming machine.

Figure 13:
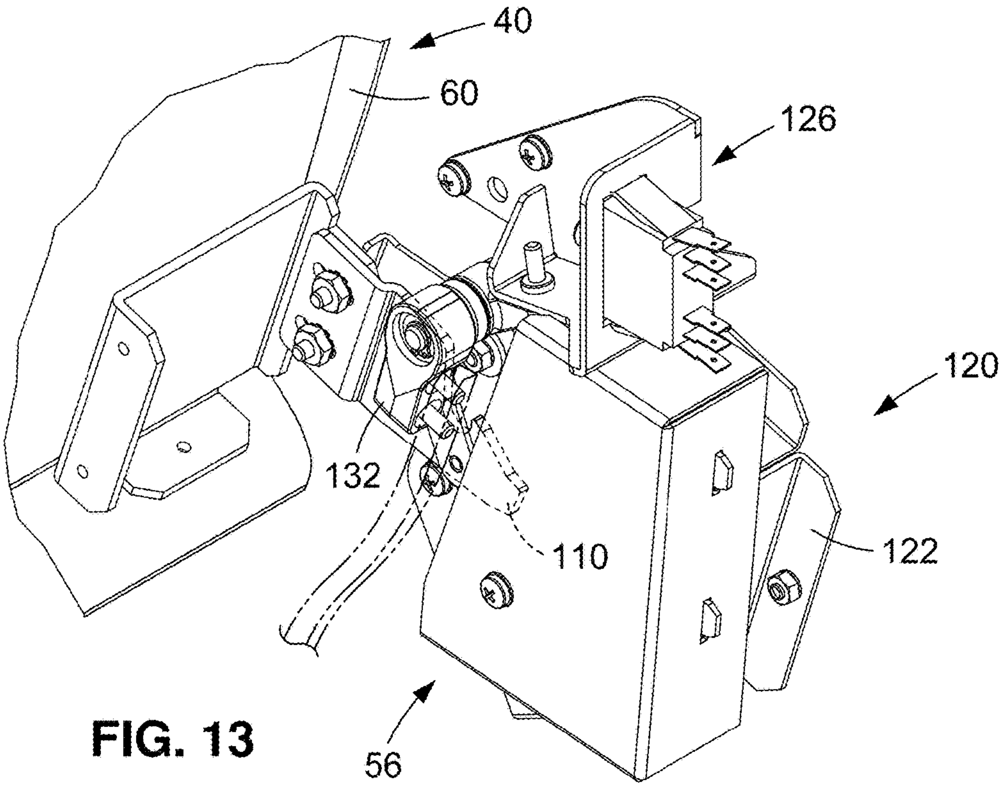
FIG. 13 is an enlarged view of the portion of the door latching assembly identified by line 13 in FIG. 12.
Figure 15:
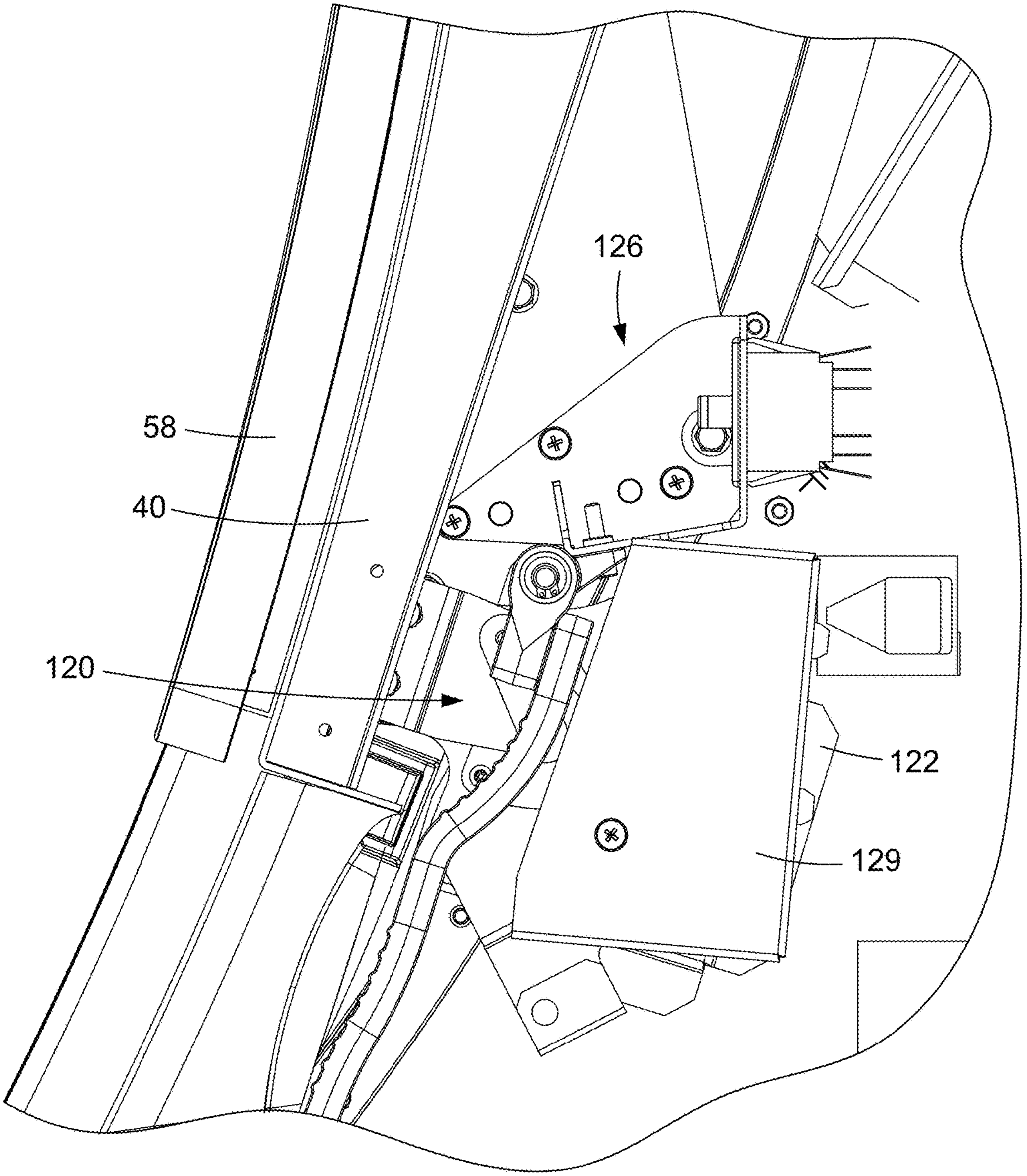
FIG. 15 illustrates the door latching assembly of FIG. 13 in a side view relative to the modified gaming machine illustrated in FIG. 1.

As illustrated in FIGS. 13-15, the actuator 126 may be used to rotate the movable locking pin 128 to a position in which it is located in the slot 112 of the catch 110 (when the door 40 is in its closed position), thus locking the door 40 in the closed position and preventing access to the interior 42 of the modified gaming machine 20. The actuator 126 may also be used to move the movable locking pin 128 out of engagement with the catch 110, thus allowing a user to move the door 40 to its open position. As illustrated, a cover 129 may be mounted over the moving locking pin 128.

In some embodiments, the door latching assembly may simply comprise the catches 110 (such as with the associated brackets 118) for use with the existing locking mechanisms 120 of the existing gaming machine. In such a configuration, the position of each catch 110 may be adjusted relative to the existing locking mechanisms 120 in order to ensure that they align and can be used with the modified door. In other embodiments, the door latching assembly may include new locking mechanisms which are associated with the housing 22 (e.g. mounted in the interior of the housing) in replacement of existing ones. In such a configuration, the position of each catch 110 may again be adjusted so that it matches with the newly provided locking mechanism.

In the embodiment described, the locking mechanism 120 may be electronically operated, such as via one or more switches or the like which cause the motor to move the movable locking pin. Of course, in other embodiments, the locking mechanism 120 might be configured to be manually operated, such as using a movable handle, slider or other elements which effectuates movement of the movable locking pin. In one embodiment, the movable locking pin may be biased towards its latched position, such as with one or more springs, wherein the looking mechanism 120 is then configured to overcome that biasing force and move the movable locking pin 126 to its latched position.

As illustrated, in a preferred configuration, there are catches 110 and associated locking mechanisms 120 provided corresponding to each side of the door 40. In other embodiments, other numbers of catches and associating locking mechanisms might be provided.

As indicated, the apparatus, such as the kit, may include other components or features. For example, in an embodiment where existing speakers (such as a speaker bar S) are removed, replacement speakers 130 (see FIG. 11) (or speakers as disconnected from such a speaker bar S or other existing gaming machine mount) may be connected to the rear of the door fame 60, such as in alignment with the speaker openings 64*a,b* (see FIG. 6).

In some embodiments, the apparatus (such as the kit) may further comprise elements such as a power supply, subwoofer, CPU, etc. that are mounted in the interior 42, such as in replacement to those of the existing gaming machine.

As indicated above, one embodiment of the invention comprises a method of modifying an existing gaming machine. As indicated, this may comprise the step of removing one or more existing video displays and their associated mounting structure (such as door and door mounts). The method may include removing other components, such as one or more speakers, a speaker bar or the like.

The method includes mounting a modified door assembly 50 to the housing of the existing gaming machine, such as by connecting the door mount 70 and the associated door 40 to the housing 22, connecting a candle C to the door mount 70 via the candle mount 84, connecting the door opening assembly 54, and connecting the door latching assembly 56.

Most importantly, when the new door 40 is mounted to the housing 22, one or more new video displays 58 may be connected thereto. In one embodiment, the one or more new video displays 58 may have one or more of a different orientation, size and shape from the one or more existing video displays that they replace. The new video displays might comprise, for example, instead of two landscape oriented 22 inch LCD displays, a single 32 inch (diagonal) portrait oriented flat or curved ("C" curved, "J", "S" or "P" curved or other shapes) LCD (or other, such as plasma, OLED, etc.) display. In some embodiments, one or more larger video displays might also be mounted in landscape orientation. As another example, if the original gaming machine door supported a portrait-oriented video display, the new display 58 might comprise one or more video displays which are mounted in landscape orientation. The mounting of the new display 58 may be facilitated by one or more mounts, such as fastener accepting holes, in different locations in the door frame 60. This allows, for example, an existing gaming machine such as that illustrated in FIG. 1 to be transformed into a modified gaming machine such as that illustrated in FIG. 2. As noted above, in one embodiment, the new video display 58 may have an increased height (increased over the existing displays that were removed and/or greater than a height of the original door), such as where the new video display 58 extends to the top of the gaming machine 20 or above it. Likewise, the door 40 may allow one or more new video displays 58 to be positioned outwardly of the frame elements 32,34, thus allowing them to even be wider than the original displays which were positioned therebetween, including by extending beyond those elements.

Once assembled, the door 40 may be moved from a closed (and preferably locked, such as via the door latching assembly 70) position as illustrated in FIG. 8, to an open position, such as where the top of the door 40 pivots around a horizontal axis relative to the housing 22, as illustrated in FIG. 9. In one embodiment, to move the door 40 to its open position, the user unlocks the locking mechanism and moves (via actuation of the latch release mechanism, such as the actuator 126) the pin out of the catch 110 of the door latching assembly 56. The user can then lift up on the door 40. As the door 40 moves towards its raised position, the shocks 100 provide a biasing force to aid in that movement and to retain the door 40 in its open position. To close the door, the user reverses that process.

In one embodiment, the apparatus of the invention comprises a retrofit kit, such as which includes a modified door and one or more of a door mounting assembly, a door opening assembly and a door latching assembly.

In accordance with the invention, a modified gaming machine is created from an existing gaming machine, such as which is configured to mount one or more new (and preferably larger) video displays. This allows an existing gaming machine to be upgraded to include new technological features, making it more attractive to a player and increasing its lifespan.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of modifying an existing gaming machine having a housing and an existing door located at a front of said housing, said existing door supporting at least one existing video display, comprising the steps of:

removing said existing door and said associated at least one existing video display from said housing;

removing an existing candle from a top of said housing;

providing a modified door assembly comprising a modified door, a door mounting assembly, a door opening assembly and a door latching assembly;

connecting a door mount of said door mounting assembly to said top of said housing at an exterior thereof and connecting said modified door to said door mount via a hinge, whereby said modified door is rotatably connected to said housing at a point exterior to said housing utilizing said door mounting assembly;

reconnecting said candle to said existing gaming machine by connecting it to said door mount at said top of said housing;

connecting said door opening assembly to said modified door and said housing, whereby said door opening assembly facilitates movement of said modified door between a first, open position relative to said housing of said housing and a second closed position;

connecting a first and a second position-adjustable catch of said door latching assembly to a rear of said modified door, each catch comprising a body which defines a latch pin accepting slot;

connecting a first latching mechanism having a first catch pin to an interior of a first side of said housing of said existing gaming machine and connecting a second latching mechanism having a second catch pin to an interior of a second side of said housing of said existing gaming machine;

adjusting a position of said first position-adjustable catch to engage said first catch pin when said modified door is moved to a closed position and adjusting a position of said second position-adjustable catch to engage said second catch pin when said modified door is moved to said closed position; and connecting at least one new video display to said modified door, said at least one new video display differing in at least one of size and shape from said at least one existing video display.

2. The method in accordance with claim 1, wherein each of said position-adjustable catches comprises a body which defines said latch pin accepting slot and first and second apertures, and said step of connecting said first and second position-adjustable catches each comprises engaging a first fastener in a first position of said first aperture and a second fastener in a second position of said second aperture.

3. The method in accordance with claim 2, wherein said first and second apertures are elongate and each define a plurality of fastener engaging positions.

4. The method in accordance with claim 1, wherein said door mount has a top and a plurality of downwardly extending flanges, said flanges spacing said top of said door mount from said top of said housing when connected thereto.

5. The method in accordance with claim 1, wherein said door opening assembly comprises at least one cabinet mount and at least one biased strut.

6. The method in accordance with claim 5, wherein said step of connecting said door opening assembly to said modified door and said housing comprises connecting said at least one cabinet mount to said housing, connecting a first end of said strut to said cabinet mount and a second end of said strut to said modified door.

7. The method in accordance with claim 6, wherein said biased strut comprises a pneumatic shock having said first end and said second end.

8. The method in accordance with claim 6, wherein said cabinet mount is connected to an interior of said first side.

9. The method in accordance with claim 8, wherein said cabinet mount defines at least one aperture and said step of connecting comprise extending a fastener through said aperture into an aperture defined in said first side of said housing.

10. The method in accordance with claim 1, wherein said at least one existing video display comprises at least one landscape oriented video display and wherein said at least one new video display is connected to said modified door in a portrait orientation.

11. The method in accordance with claim 1, wherein said at least one existing video display is planar and said at least one new video display is at least partially curved.

12. The method in accordance with claim 1, wherein said modified door has a front and a rear and an opening extending therethrough, and wherein said at least one new video display is located at said front of said modified door with a portion of at least one new video display extending into said opening through said modified door.

13. The method in accordance with claim 1, wherein said existing gaming machine further comprises first and second frame elements located at opposing sides of said existing door and wherein in said second position said modified door is positioned between said first and second frame elements.

14. A retrofit kit for use in modifying an existing gaming machine having a housing and an existing door, comprising:

a modified door having a frame, a front, a rear and at least one opening through said frame from said front to said rear of said modified door;

a door mounting assembly comprising a door mount having a top surface and a plurality of downward flanges for connection to a top of said housing of said existing gaming machine and having a hinge connected thereto for connection to said modified door to permit said modified door to be movably mounted to said housing at a point exterior to said housing in replacement of said existing door;

a door opening assembly, said door opening assembly comprising at least one biasing member and at least one cabinet mount, said at least one cabinet mount configured to be connected to said housing and said at least one biasing member configured to be connected to said at least one cabinet mount and said modified door; and a door latching assembly comprising at least one position-adjustable catch for connection to said modified door at a rear side thereof and a latch assembly configured to be connected to a side of said housing and having a pin for engagement by said position-adjustable catch; and said modified door configured to facilitate location of at least one new video display at said front thereof.

15. The retrofit kit in accordance with claim 14, wherein said door mount further comprises a candle mount connectable to said door mount for location at said top surface thereof.

* * * * *